UNITED STATES PATENT OFFICE.

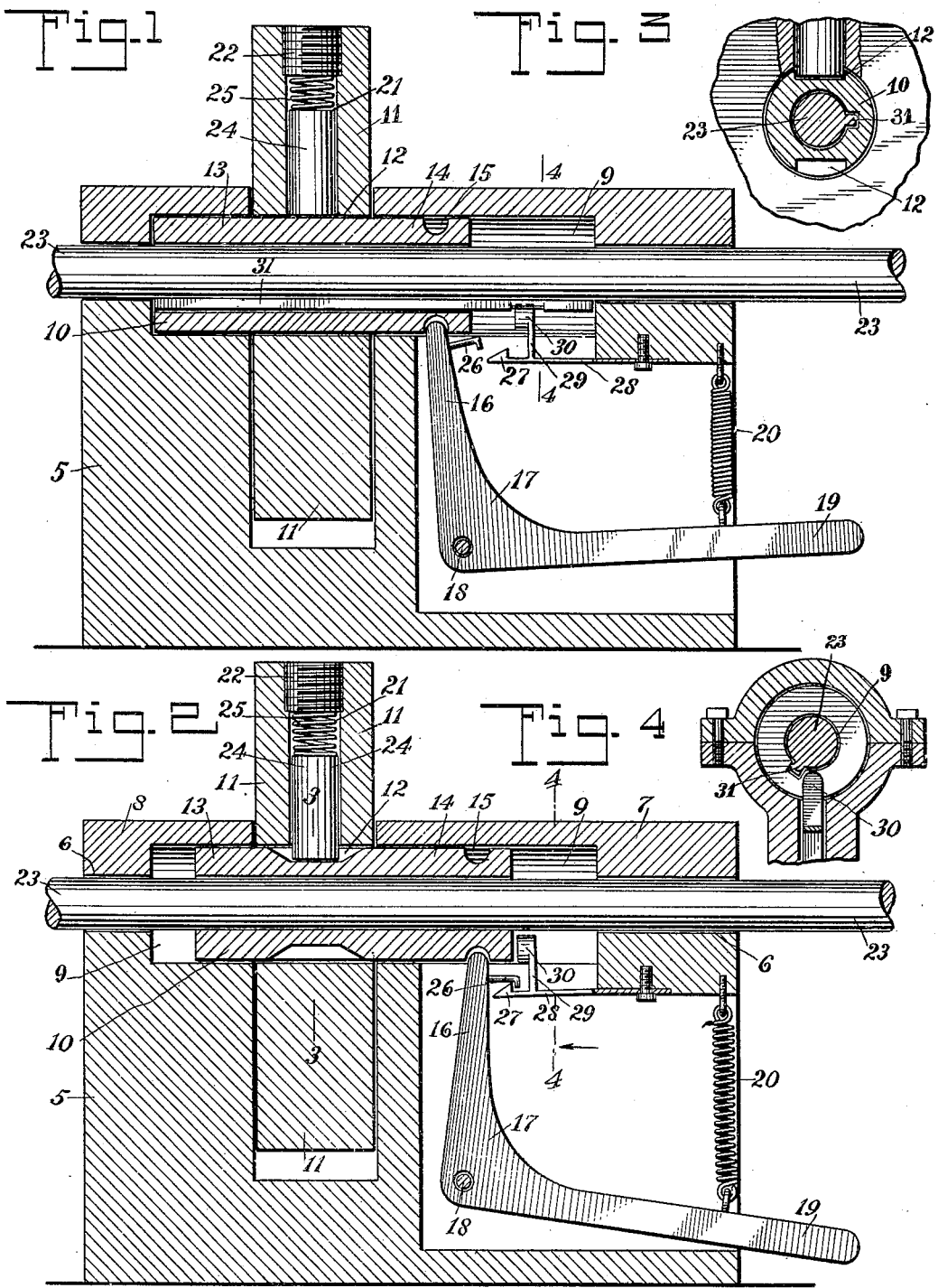

WALTER E. KNOELL, OF MINNEAPOLIS, MINNESOTA.

CLUTCH.

945,551.  Specification of Letters Patent.  Patented Jan. 4, 1910.

Application filed April 20, 1909. Serial No. 490,997.

*To all whom it may concern:*

Be it known that I, WALTER E. KNOELL, a citizen of the United States, and a resident of Minneapolis, in the county of Hennepin and State of Minnesota, have invented a certain new and useful Clutch, of which the following is a full, clear, and exact description.

The objects which the present invention has in view are, to provide a clutch which will automatically release at the first revolution of the shaft after engagement, and to provide a simple and efficient clutch operating mechanism.

Reference is to be had to the accompanying drawings forming a part of this specification, in which similar characters of reference indicate corresponding parts in all the views.

Figure 1 is a vertical longitudinal section of a shaft bearing, clutch and clutch wheel, constructed in accordance with my invention, and showing the parts in the disengaged position; Fig. 2 is a view similar to Fig. 1, showing the parts as arranged in the engaged position; Fig. 3 is a cross section of the shaft, wheel and clutch shaft, taken on the line 3—3 in Fig. 2; and Fig. 4 is a sectional view of the shaft mounting and of the shaft taken on the line 4—4 in Fig. 1.

The structure consists of a main shaft bearing bracket 5, provided with suitable bearing in the ends thereof at 6—6, one side of each of the bearings being formed by caps 7 and 8. These bearings may be made in any of the approved styles, either anti-friction, hard metal or babbitted bearings. Between the bearings there is provided a chamber 9, within which is slidably mounted a sleeve 10, which forms a mounting for a pulley 11.

The sleeve 10 is provided with recesses 12—12 and end cylindrical portions 13 and 14. The cylindrical portion 13 is of a length sufficient to carry and form a smooth running mounting for the pulley 11. The portion 14 is provided with an annular groove 15 which receives the free end 16 of a bell-crank.

The bell-crank 17 is pivotally mounted in the bracket 5 at 18, and has an elongated extension 19 by which the said bell-crank is manually operated. The extension 19 is connected with the bracket 5 by a coiled spring 20, so adjusted as to draw the extension 19 to throw the free end 16 of the bell-crank 17 to the position shown in Fig. 1 of the drawings. The pulley 11 is provided with a perforation 21, the upper end of which is screw-threaded to receive in threaded engagement a screw 22, the said perforation 21 extending through the pulley in line with the center of the main driving shaft 23. A piston 24 fits snugly within the perforation 21 and is provided with a spiral spring 25 to force the said pin 24 against the surface of the sleeve 10.

With a device constructed as above described, the operation is as follows: To engage the pulley 11, the bell-crank lever 17 is thrown to the position shown in Fig. 2 of the drawings. In this position the grooves 12 have been thrown forward until the same are in the track of the pin 24, and the pin 24 is forced into the grooves 12 by the spiral spring 25, when one of said grooves takes a position under the said pin. The free end 16 of the lever 17 has been drawn forward so that the hook 26, with which the said end is provided, engages the head 27 of a spring latch 28. The sleeve 10 is held by the head 27 against a return to its normal position, that shown in Fig. 1 of the drawings, and to which the spring 20 immediately returns the said sleeve when the hook 26 is disengaged from the head 27. To effect this disengagement, there is provided an extension arm 29 upon which is provided a rounded head 30 which is so disposed that it extends into the track of a feather 31 on which the sleeve 10 slides. Each revolution of the shaft 23 presents the edge of the feather 31 to the head 30 of the spring latch 28. In passing under the head 30 the latch 28 is raised to release the hook 26, and thereby allows the spring 20 to throw the bell-crank to the position shown in Fig. 1 of the drawings.

The present invention is particularly adapted for use in the class of machines wherein a single rotation of the driving pulley is desired, and wherein the timing of such rotation is manually controlled.

The mechanism described is very compact, simple and easily cared for, and the parts are quickly and readily replaced.

Having thus described my invention, I claim as new and desire to secure by Letters Patent:

1. A clutch, comprising a wheel having a detent mounted therein, a sleeve on which said wheel is loosely mounted, said sleeve being adapted to be shifted on the driving shaft, shoulders formed on the said sleeve to engage the said detent, and a suitable mechanism for shifting the said sleeve on the driving shaft.

2. A clutch, comprising an elongated sleeve mounted on a driving shaft to slide longitudinally thereon, said sleeve having a section forming a continuous bearing for a wheel and a section having recesses, a wheel having an engaging member mounted therein adapted to engage said recesses when moved into line therewith, and suitable mechanism for shifting the said sleeve to present alternately the smooth section and the recessed section to the said wheel.

3. A clutch comprising an elongated sleeve mounted on a driving shaft to slide longitudinally thereon, said sleeve having a section forming a continuous bearing for a wheel and a section having recesses, a wheel having an engaging member mounted therein adapted to engage said recesses when moved into line therewith, means for forcing the said engaging members to engage the said recesses, and suitable mechanism for shifting the said sleeve to present alternately the smooth section and the recessed section to the said wheel.

4. A clutch, comprising an elongated sleeve mounted on a driving shaft to slide longitudinally thereon, said sleeve having a section forming a continuous bearing for a wheel and a section having recesses, a wheel having an engaging member mounted therein adapted to engage said recesses when moved into line therewith, a spring-actuated detent to hold the sleeve in engaged position, and suitable mechanism for shifting the said sleeve to said engaged position.

5. A clutch, comprising an elongated sleeve mounted on a driving shaft to slide longitudinally thereon, said sleeve having a section forming a continuous bearing for a wheel and a section having recesses, a wheel having an engaging member mounted therein adapted to engage said recesses when moved into line therewith, a spring-actuated detent to hold the sleeve in engaged position, a device actuated by the driving shaft to release the said detent to permit the sleeve to return to the disengaged position, and suitable mechanism for shifting the said sleeve to present alternately the smooth section and the recessed section to the said wheel.

6. A clutch, comprising an elongated sleeve mounted on a driving shaft to slide longitudinally thereon, said sleeve having a section forming a continuous bearing for a wheel and a section having recesses, a wheel having an engaging member mounted therein adapted to engage said recesses when moved into line therewith, a spring-actuated detent to hold the sleeve in engaged position, a device actuated by the driving shaft to release the said detent to permit the sleeve to return to the disengaged position, and suitable mechanism for shifting the said sleeve to present alternately the smooth section and the recessed section to the said wheel, said mechanism embodying a spring to shift the sleeve to the disengaged position.

In testimony whereof, I have signed my name to this specification in the presence of two subscribing witnesses.

WALTER E. KNOELL.

Witnesses:
C. M. SPILMAN,
I. B. FESSENDEN.